Figure 1:
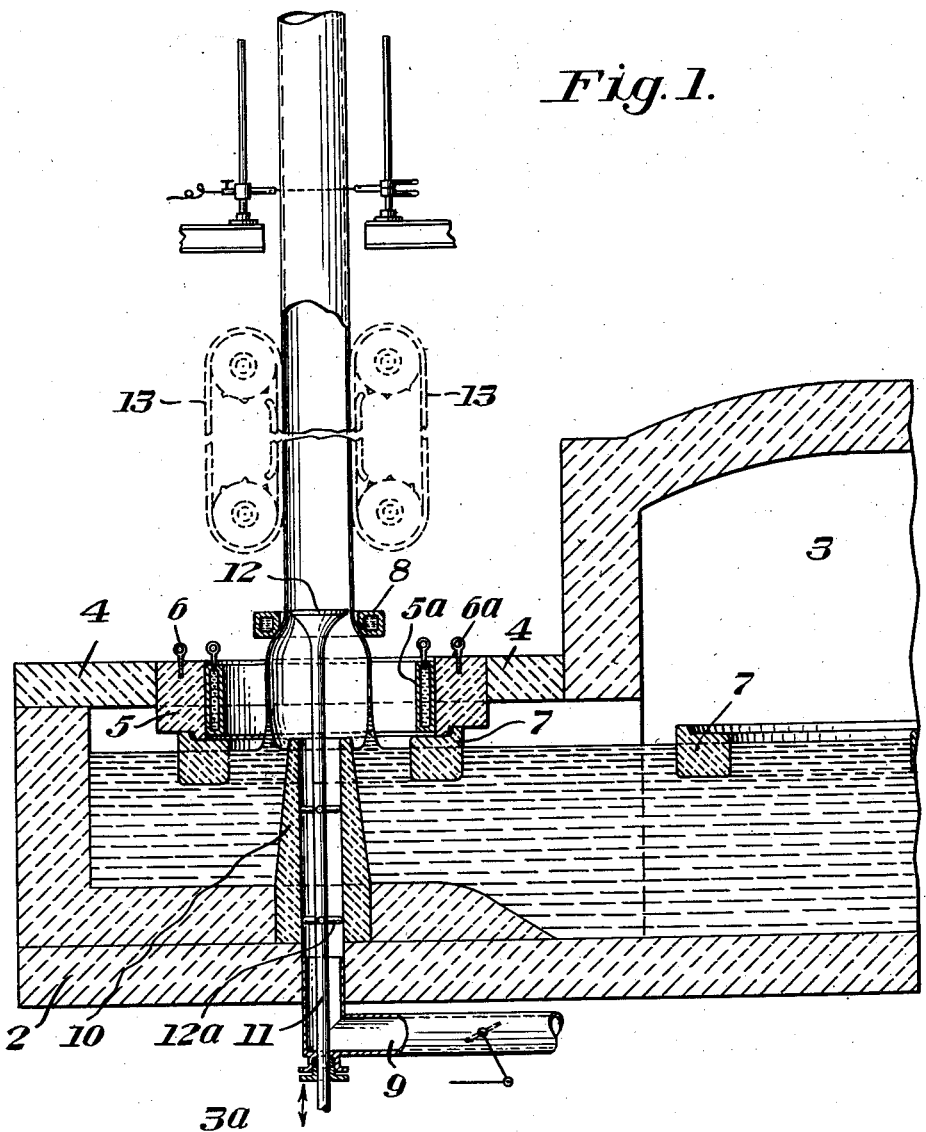

Sept. 28, 1948.  C. P. BYRNES  2,450,115
DIE DRAWING OF HOLLOW GLASS BLANKS
Filed Aug. 20, 1943

INVENTOR
Clarence P. Byrnes

Patented Sept. 28, 1948

2,450,115

UNITED STATES PATENT OFFICE 2,450,115

DIE DRAWING OF HOLLOW GLASS BLANKS

Clarence P. Byrnes, Fort Lauderdale, Fla.

Application August 20, 1943, Serial No. 499,433

6 Claims. (Cl. 49—17.1)

My invention relates to apparatus for drawing sized hollow glass blanks such as pipe, tubing, cylinders, polygonal shapes, etc., from forehearths or doghouses connected to tank furnaces, or from a tank furnace itself in a sheltered portion thereof. It is designed to cheapen and improve the process and apparatus as well as to increase accuracy, quality, and output of the hollow blanks.

Heretofore glass cylinders have been drawn and sized intermittently by upward drawing with a bait through two-part dies, from a double pot mounted in a kiln; the glass is ladled intermittently into such pot. In using my apparatus the glass is continuously supplied from the tank to the drawing station or stations and a considerable loss of glass as well as loss of time is avoided and less labor used. At the same time, waiting for "melting back" or preparing the glass bath between each blank drawing is avoided. In the preferred form, a succession of blanks is drawn in continuous manner, i. e., with continuous connection to the glass bath. In case of crash or other accident, the bath connection may be severed and melting back carried out. If then remelted in place, provision is made for hastening the remelt, or the colder glass may be moved out into the furnace proper for remelt, or drawing started at another drawing station until remelting is accomplished.

Figure 2:
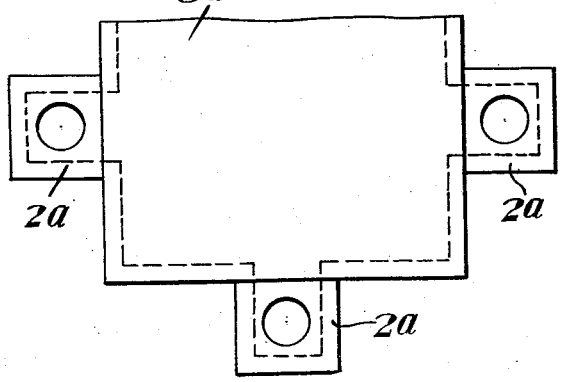

In the drawings, Figure 1 is a diagrammatic vertical section showing a doghouse tank furnace with a preferred form of drawing system; and Figure 2 is a diagrammatic plan view of the end portion of a tank furnace and forehearths.

In the preferred form of apparatus of Figure 1, a forehearth 2, extending out from the tank furnace 3, has a topstone 4 with a circular hole containing a cylindrical refractory shield 5 surrounding a fluid cooled metallic shield 5a. These shields are adjusted vertically by eyes 6, 6a, and may consist of a hollow metallic centre with fluid cooling connections and a refractory surrounding jacket. This shield device coacts with one of a series of partly submerged floating refractory rings 7 to cut off the heat currents above the bath from the drawing place. The shield preferably interfits with a circular recess of the floating ring as shown, to hold the ring in correct concentric position below the drawing opening and around the air nozzle and sizing dies.

8 is a die ring of heat-resistant alloy made in multiple arc-shaped parts and hollow for fluid cooling; which is supported at a level within a zone far enough above the level of the glass bath to prevent its forming an opaque skin or even marring of the glass; and yet near enough to bend the glass in and size and shape it to cylindrical or polygonal form while still plastic. The interior surface of the ring 8 corresponds to the shape desired for the walls of the hollow blank. This distance will depend on the percentage of cooling in shields 5, 5a, the height of the topstone above the bath, etc., but is generally over 6 or 8 inches from the bath surface. An exterior transparent skin forms on the cylinder before it strikes the curved deflecting and sizing surfaces of the die; but no opaque skin is formed by the die when at the proper level.

In this form the distension air is supplied through valved air supply pipe 9 leading to vertical cylinder nozzle 10 extending upwardly to a level above the glass bath and substantially concentric with the shaping dies above and with the cylindrical shield 5. This nozzle is either made of refractory material, or of a metal alloy of high heat resistance, or a carbide, or fused quartz or silica, or both. It may be of refractory material surrounding and protecting a metal alloy tube; or it may be of refractory lined with a high temperature insulation cement, or of an alloy tube with such a cement between it and the refractory casing. If of a heat-resistant metal alloy such as the rhodium alloys now used in outlets for molten glass, the nozzle will be protected by freezing of molten glass around it, this frozen annulus separating it from the molten bath. This nozzle supplies controlled distending air, and also acts as guide and protection for the stem 11 of a horizontal stopper 12 which holds the desired air pressure in the glass cylinder being drawn. This stopper 12 is removably connected to the upper end of guide tube or stem 11, which stem preferably has centering prongs or projections 12a engaging the inner surface of the nozzle. The stopper may preferably be vertically adjusted by moving its stem 11 vertically, as indicated by the double-headed arrow at the lower part of Figure 1. The stopper of heat-resistant alloy or material is changed for different sizes and cross-sectional shapes of hollow blanks and fits closely the inner surface of the sized blank with a gap of, say, $\frac{1}{16}$ of an inch or less, which acts as a desirable vent for the air pressure within the cylinder which is somewhat superatmospheric. The air holding stopper 12 is positioned vertically within the sized die-drawn portion of the blank being drawn, after it has been acted upon by the dies; being either within or above the level of the shaping and sizing dies. This is important since in the lower parts of the glass blank below the die level the blank is egg-shaped or elliptical with varying axes, and is not truly circular in cross-section; hence if the stopper were below the die, the escaping air would vary largely and hence vary the cylinder size undesirably. There is an important coaction between the die and stopper in holding the air pressure relatively constant, by keeping the air-escape gap or vent relatively constant.

During operation the air fed up through the nozzle cools the stopper stem and the nozzle and maintains the needed low superatmospheric pressure in the plastic rising glass blank, this air having the usual controls as to volume, pressure, etc.

After the original draw has reached a desirable height, continuous draw apparatus of any desirable type may be put into operation, either by endless belt grippers engaging the glass cylinder itself above the die level as indicated by dotted lines 13; or by the deforming lifter system of my Patent No. 1,425,746 of August 15, 1922, or by any other desirable system. If the cylinder is deformed for lifter engagement, as shown for example in my said patent, this deforming should be done below the die level, the lifters engaging the deformed portions above the level of the dies.

Blanks of the desired lengths may be severed from the rising cylinder during draw, by electric crack-off sticks such as disclosed in my said patent. The heating wire of such stick is applied at a level above the stopper and allowed to travel up with the cylindrical blank as it rises and then opened and withdrawn and a cold iron applied to crack and sever the glass. The wire loop is then moved down for the next severance.

As an example of relative sizes, in drawing a cylinder of, say, 8 inch or slightly greater diameter, the refractory air nozzle may be about 3½ to 4 inches diameter, the supporting stem (pipe or rod) about 1 inch diameter, and the refractory floating rings of about 18 to 20 inches inside diameter.

In case of a cylinder crashing or a breakdown from any cause, so that chilled glass is present in the drawing ring 7, several different courses may be followed during the interim.

Thus, the stopper 12 may be removed and its stem or tube dropped down; the cylindrical shield or shields 5, 5a, may be lifted and a heating device lowered into the draw-hole in the topstone. One form of such a gas burning reheater is known in the trade as a "Selas Burner" which would effectively and rapidly reheat the glass within the ring by radiation.

Another course is to remove the shields, move the floating ring slightly sidewise, and then lift one side thereof over the nozzle and shove the ring back into the furnace; and by reversing the movements bring another floating ring from the furnace, and install it around the air nozzle and restore the shields, etc. During this operation, a refractory cover may be applied over the drawhole, and heat current allowed to circulate below it to reheat and keep hot the glass in the doghouse.

In case of starting to draw another size or type of blank, the stopper 12 and stem are disconnected and another stopper applied of suitable size and shape for the desired blank being drawn. Instead of using movable floating rings in the bath which are moved in and out of drawing position, the furnace 3a may be provided with several forehearths or drawing enclosures 2a, as shown in Figure 2, and in case of a stoppage or breakdown, the cylindrical shield may be lifted out and a draw made at another forehearth or enclosure while melting back of the refuse glass proceeds at the former forehearth. In such case the drawing apparatus may be moved from forehearth to forehearth.

The cylinder may at a level above the die pass up within a heat retaining enclosure which acts to anneal the rising cylinder and prevent air drafts thereon which might crack the glass. This enclosure may be of two or more parts split vertically and adjustable toward and from the glass axis; or may be partial, as desired. It may be of refractory, metal, reinforced refractory or metal.

Air may be supplied through a tubular stem of the disc, this air emerging through holes below the disc, the stem fitting within the nozzle to prevent escape of air beyond that desirable for venting.

The advantages of my invention result mainly from continuous operation with sizing dies, i. e., continuous connection of a hollow blank with the glass bath and intermittent severing of sized blanks of the desired lengths. This gives a large increase in production, while the dies cooperate with the stopper which keeps a superatmospheric pressure within the rising hollow glass tube. That is, the dies shape and size the glass to final size and form and thus enable a stopper to fit the shaped and sized bore sufficiently to hold the desired pressure and at the same time allow desirable venting which prevents "breathing" of the glass in the plastic zone of the blank. If the glass were not shaped and sized, the loss of air would be variable and would cause large variations of size of blank due to variations in the distending pressure. The ring-shaped enclosure for the draw (floating ring) also aids in this substantial uniformity, as does also the cylindrical shield which keeps out the surrounding heat currents over the bath during the draw. All these elements are substantially concentric with the blank.

The stopper which keeps air pressure within the plastic zone of the rising hollow blank may be of compressed asbestos or other heat-resistant material. It may be carried on a tube or rod which in turn is supported within and by the heat-resistant air supply nozzle; and it and the support may be lifted upwardly for removal and replacing in case of a temporary shut-down or a change in the glass blanks to be made. The cylindrical shield device which protects the draw may be made as one element—a refractory shield with an inner water-cooled core. Instead of outwardly projecting forehearths, the sheltered drawing bays may be cut into and form parts of the tank furnace proper. Suitable means are used for adjusting the stopper and stem, for control and regulating the air supply, for removal of cylindrical blanks, etc. Floating rings of different sizes and shapes may be used for drawing of cylinders or tubes of different sizes, the sizing dies being correspondingly changed.

Many other changes may be made within the scope of my claims, since I consider myself the first to devise a continuous die drawing system for hollow glass blanks where continuous connection is kept between the rising blanks and the glass bath in drawing a series of blanks; especially where some superatmospheric pressure is maintained in the plastic zone of the rising glass meniscus, even during severing and removal of blanks.

I claim:

1. In apparatus for forming hollow glass blanks, a receptacle for a molten glass bath, means for drawing hollow glass upwardly from a glass bath therein, a relatively stationary shaping and sizing die having an interior surface corresponding to the desired external shape of the hollow glass blanks and through which the hollow glass is drawn, said die being arranged to deflect the plastic walls of the hollow glass inwardly as it is drawn upwardly, an internal stopper supported at a level at least as high as that of the external die and arranged to coact with the inner surface of the shaped and sized hollow glass to hold distention air pressure therein below the stopper level, and means for continuously supplying distention air at a level below the stopper.

2. In apparatus for forming hollow glass blanks, a receptacle for a molten glass bath, means for drawing hollow glass upwardly from a glass bath therein, a relatively stationary shaping and sizing die having an interior surface corresponding to the desired external shape of the hollow glass blanks and through which the hollow glass is drawn, said die being arranged to deflect the plastic walls of the hollow glass inwardly as it is drawn upwardly, an internal stopper supported at a level within the rising hollow glass at least as high as that of the external die and having an external contour corresponding to and a circumference slightly smaller than the shaped and sized hollow glass drawn up around it.

3. In apparatus for drawing hollow glass blanks, a container for a molten glass bath, means for supplying heat, means for drawing hollow glass upwardly from the glass bath, an enclosure within the container arranged to at least partially shield the hollow glass from surrounding heat, said enclosure corresponding in general internal contour to that of the hollow glass drawn up, a shaping and sizing die arranged to deflect the rising hollow glass inwardly while still plastic, said die being sufficiently far above the bath level to prevent opaque skin formation, an internal stopper above the level at which the die deflects the rising walls of the hollow glass inwardly, said stopper having an external contour corresponding to the internal contour of the shaped and sized hollow glass, and means for continuously supplying distention air below the stopper.

4. In apparatus for drawing hollow glass blanks, a container for a molten glass bath, means for supplying heat, means for drawing hollow glass upwardly from the glass bath, an enclosure within the container arranged to at least partially shield the hollow glass from surrounding heat, said enclosure corresponding in general internal contour to that of the hollow glass drawn up, a shaping and sizing die arranged to deflect the rising hollow glass inwardly while still plastic, said die being sufficiently far above the bath level to prevent opaque skin formation, an internal stopper above the level at which the die deflects the rising walls of the hollow glass inwardly, said stopper having an external contour corresponding to the internal contour of the shaped and sized hollow glass, an annular heat shield coacting with the enclosure to give an enclosed atmosphere for the draw, and means for continuously supplying distention air below the stopper.

5. In apparatus for forming hollow glass blanks, a receptacle for a molten glass bath, means for drawing hollow glass upwardly therefrom, a relatively stationary stopper around which the hollow glass is drawn, means for supplying distention air below the stopper, and an external relatively stationary die through which the hollow glass is drawn, said die being arranged to deflect the rising glass inwardly to size and shape successive portions thereof to correspond to the external contour of the stopper before the hollow glass reaches the stopper level; whereby substantially uniform pressure is maintained in the rising hollow glass below the stopper.

6. In apparatus for forming hollow glass blanks, a receptacle for a molten glass bath, means for drawing hollow glass upwardly therefrom, a relatively stationary stopper around which the hollow glass is drawn, means for supplying distention air below the stopper, and an external relatively stationary die through which the hollow glass is drawn, said die being located at a level as low as the stopper and being arranged to deflect the rising glass inwardly to size and shape successive portions thereof to correspond to the external contour of the stopper before the hollow glass reaches the stopper level; whereby substantially uniform pressure is maintained in the rising hollow glass below the stopper.

CLARENCE P. BYRNES.

REFERENCES CITED

The following references are of record in the file of this patent:

UNITED STATES PATENTS

| Number | Name | Date |
| --- | --- | --- |
| 702,015 | Lubbers | June 10, 1902 |
| 846,102 | Frink | Mar. 5, 1907 |
| 1,425,746 | Byrnes | Aug. 15, 1922 |
| 1,892,806 | Pedersen | Jan. 3, 1933 |
| 1,987,633 | Pedersen | Jan. 15, 1935 |
| 2,166,871 | Luertzing | July 18, 1939 |
| 2,267,554 | Despret | Dec. 23, 1941 |